United States Patent
Kim et al.

(10) Patent No.: US 9,775,021 B2
(45) Date of Patent: Sep. 26, 2017

(54) METHOD AND DEVICE FOR SUPPORTING MTC TRIGGER OF SERVING NODE IN WIRELESS COMMUNICATION SYSTEM

(71) Applicant: LG ELECTRONICS INC., Seoul (KR)

(72) Inventors: Hyunsook Kim, Anyang-si (KR); Jaehyun Kim, Anyang-si (KR); Laeyoung Kim, Anyang-si (KR); Taehyeon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 74 days.

(21) Appl. No.: 14/362,045

(22) PCT Filed: Nov. 30, 2012

(86) PCT No.: PCT/KR2012/010305
§ 371 (c)(1),
(2) Date: May 30, 2014

(87) PCT Pub. No.: WO2013/081412
PCT Pub. Date: Jun. 6, 2013

(65) Prior Publication Data
US 2014/0286162 A1    Sep. 25, 2014

Related U.S. Application Data

(60) Provisional application No. 61/565,503, filed on Nov. 30, 2011, provisional application No. 61/567,593, (Continued)

(51) Int. Cl.
*H04W 8/02* (2009.01)
*H04W 4/00* (2009.01)
(Continued)

(52) U.S. Cl.
CPC ............ *H04W 8/02* (2013.01); *H04W 4/005* (2013.01); *H04W 4/20* (2013.01); *H04W 4/14* (2013.01)

(58) Field of Classification Search
CPC ......... H04W 8/02; H04W 4/005; H04W 8/22; H04L 69/24
(Continued)

(56) References Cited

U.S. PATENT DOCUMENTS

| | | | | |
|---|---|---|---|---|
| 2011/0270984 A1* | 11/2011 | Park | ........................ | H04W 4/00 709/225 |
| 2013/0080597 A1* | 3/2013 | Liao | ...................... | H04W 4/005 709/219 |
| 2013/0279372 A1* | 10/2013 | Jain | ........................ | H04W 4/06 370/254 |

FOREIGN PATENT DOCUMENTS

| | | |
|---|---|---|
| KR | 10-2011-0081750 | 7/2011 |
| KR | 10-2011-0092875 | 8/2011 |

(Continued)

OTHER PUBLICATIONS

PCT International Application No. PCT/KR2012/010305, International Search Report dated Feb. 22, 2013, 16 pages.
(Continued)

*Primary Examiner* — Andrew Chriss
*Assistant Examiner* — Voster Preval
(74) *Attorney, Agent, or Firm* — Lee Hong Degerman Kang & Waimey

(57) ABSTRACT

One embodiment of the present invention discloses a method for allowing a serving node to support a trigger request of a machine type communication-interworking function (MTC-IWF) in a wireless communication system, and the method for supporting the trigger request comprises the steps of: receiving, from a terminal, capability information which contains information on trigger transmission; and
(Continued)

determining whether to transmit the information on the trigger transmission to a home subscriber server (HSS)/home location register (HLR), based on the information related to the terminal, which contains the capability information, and information related to the serving node, wherein the information on the trigger transmission contains information indicating whether the terminal supports a trigger request through the MTC-IWF and the serving node.

10 Claims, 8 Drawing Sheets

Related U.S. Application Data filed on Dec. 6, 2011, provisional application No. 61/585,660, filed on Jan. 12, 2012, provisional application No. 61/676,338, filed on Jul. 27, 2012.

(51) Int. Cl.
  *H04W 4/20* (2009.01)
  *H04W 4/14* (2009.01)

(58) Field of Classification Search
  USPC .......................................................... 370/230
  See application file for complete search history.

(56) References Cited

FOREIGN PATENT DOCUMENTS

| | | |
|---|---|---|
| KR | 10-2011-0122643 | 11/2011 |
| WO | 2011/136589 | 11/2011 |

OTHER PUBLICATIONS

3rd Generation Partnership Project, "Technical Specification Group Services and System Aspects; Security aspects of Machine-Type Communications; Release 11", 3GPP TR 33.868 V0.5.0, Jul. 2011, 29 pages.

* cited by examiner

METHOD AND DEVICE FOR SUPPORTING MTC TRIGGER OF SERVING NODE IN WIRELESS COMMUNICATION SYSTEM

CROSS-REFERENCE TO RELATED APPLICATIONS

This application is the National Stage filing under 35 U.S.C. 371 of International Application No. PCT/KR2012/010305, filed on Nov. 30, 2012, which claims the benefit of U.S. Provisional Application Ser. Nos. 61/565,503, filed on Nov. 30, 2011, 61/567,593, filed on Dec. 6, 2011, 61/585,660, filed on Jan. 12, 2012 and 61/676,338, filed on Jul. 27, 2012, the contents of which are all hereby incorporated by reference herein in their entirety.

TECHNICAL FIELD

Following description relates to a wireless communication system, and more particularly, to a method of supporting an MTC (machine type communications) triggering of a serving node and an apparatus therefor.

BACKGROUND ART

A machine type communication means a communication scheme including one or more machines and is also called an M2M (machine-to-machine) communication or an object communication. In this case, a machine means an entity which is not requiring a direct handling of a human or involvement of the human. For instance, an example of the machine may include a smartphone capable of performing a communication by automatically accessing a network without a handling/involvement of a user as well as a device such as a meter or a vending machine equipped with a mobile communication module. Various examples of the machine are called an MTC device or simply a device in this disclosure. In particular, the MTC indicates a communication performed by one or more machines without a handling/involvement of a human.

The MTC may include a communication (e.g., D2D (device-to-device) communication) between MTC devices and a communication between an MTC device and an MTC application server. As an example of the communication between the MTC device and the MTC application server, a communication between a vending machine and a server, a communication between a POS (point of sale) device and a server and a communication between an electric, gas or water meter and a server. Besides, an application based on the MTC may include a security application, a transportation application, a healthcare application, and the like.

DISCLOSURE OF THE INVENTION

Technical Task

A technical task of the present invention is to provide a method of precisely and efficiently performing a triggering for an MTC device.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to a first technical aspect of the present invention, a method of supporting a trigger request of an MTC-IWF (machine type communication-interworking function), which is supported by a serving node in a wireless communication system includes the steps of receiving capability information including information on a trigger delivery from a user equipment and determining whether to transmit the information on the trigger delivery to an HSS (home subscriber server)/an HLR (home location register) based on information on the user equipment including the capability information and information on the serving node, wherein the information on the trigger delivery includes whether the user equipment supports the trigger request via the MTC-IWF and the serving node.

To further achieve these and other advantages and in accordance with the purpose of the present invention, according to a second technical aspect of the present invention, a serving node device supporting a trigger request of an MTC-IWF (machine type communication-interworking function) in a wireless communication system includes a transceiving module and a processor, the processor configured to receive capability information including information on a trigger delivery from a user equipment, the processor configured to determine whether to transmit the information on the trigger delivery to an HSS (home subscriber server)/an HLR (home location register) based on information on the user equipment including the capability information and information on the serving node, wherein the information on the trigger delivery includes whether the user equipment supports the trigger request via the MTC-IWF and the serving node.

The first to the second technical aspect of the present invention can include items in the following.

The information on the user equipment further includes whether the user equipment corresponds to a roaming user equipment and the information on the serving node can include at least one selected from the group consisting of congestion status information of the serving node, capability information of the serving node on a triggering and preference of the serving node.

If the user equipment supports the trigger request via the MTC-IWF and the serving node and if the user equipment corresponds to the roaming user equipment, the serving node can determine whether to transmit the information on the trigger delivery to the HSS/the HLR in a manner of further considering at least one of a roaming agreement and a local policy.

If the serving node is not in a congestion status, the serving node can transmit the information on the trigger delivery to the HSS/the HLR.

If it is expected that the serving node is not in a congestion status, the serving node can transmit the information on the trigger delivery to the HSS/the HLR.

If a trigger request for a different user equipment which is attached to the serving node, uses the MTC-IWF and the serving node, the serving node can transmit the information on the trigger delivery to the HSS/the HLR.

If the serving node does not support the trigger request via the MTC-IWF and the serving node for a prescribed time interval, the serving node may not transmit the information on the trigger delivery to the HSS/the HLR.

If the user equipment supports the trigger request via the MTC-IWF and the serving node, the serving node can transmit the information on the trigger delivery to the HSS/the HLR.

The capability information may be received together when the serving node receives an attach request from the user equipment.

If the serving node transmits the information on the trigger delivery to the HSS/the HLR, the information on the trigger delivery can be delivered to the MTC-IWF after being stored in the HSS/the HLR. In this case, the information on the trigger delivery transmitted to the HSS/the HLR can be transmitted in a manner of being included in at least one of an update location request message and a notify request message in an attach procedure of the user equipment. Moreover, the information on the trigger delivery delivered to the MTC-IWF can be delivered in a query HSS among an MTC triggering procedure of the MTC-IWF.

The serving node may correspond to one of an SGSN (serving GPRS (general packet radio service) supporting node), an MME (mobility management entity), and an MSC (mobile switching center).

It is to be understood that both the foregoing general description and the following detailed description are exemplary and explanatory and are intended to provide further explanation of the invention as claimed.

Advantageous Effects

According to the present invention, a method of precisely and efficiently performing a triggering for an MTC device can be provided.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Mode for Invention

Figure 1:
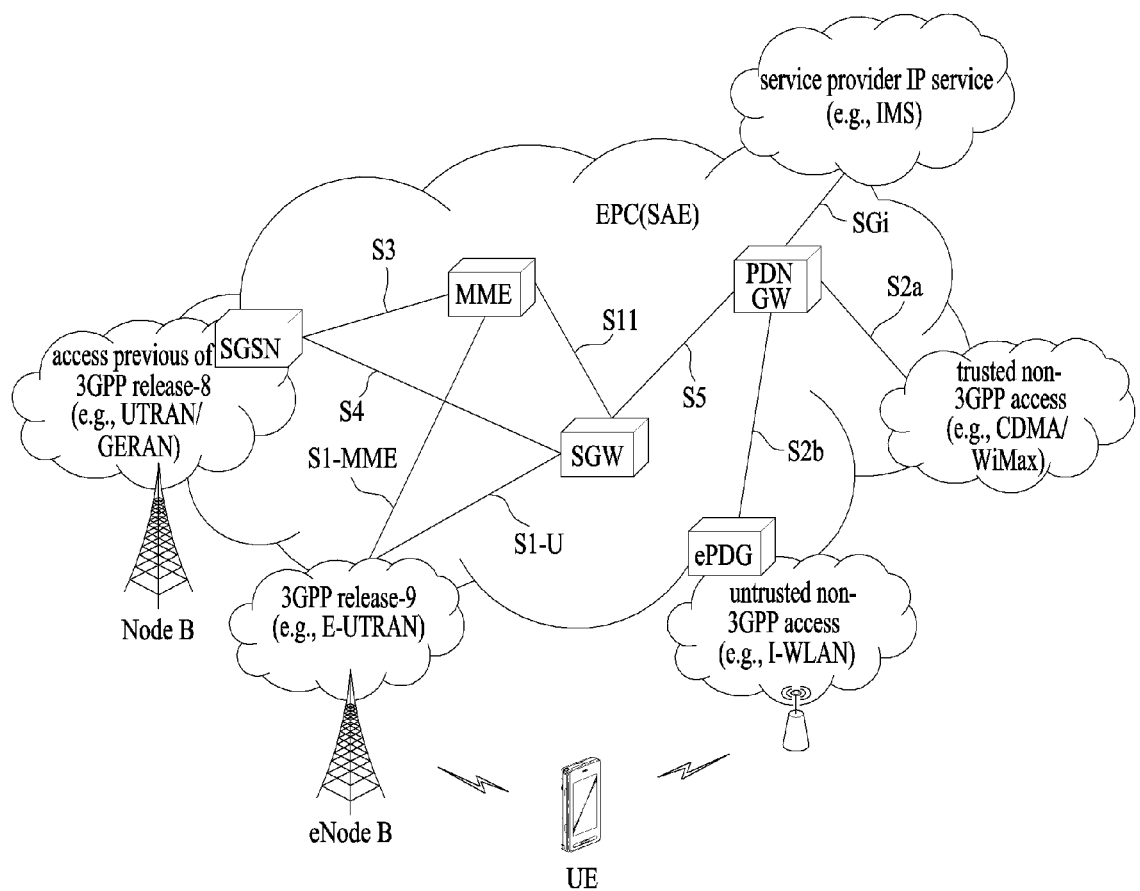
FIG. 1 is a diagram for a schematic structure of an EPC (evolved packet core)

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE (institute of electrical and electronics engineers) 802 system, 3GPP system, 3GPP LTE system, 3GPP LTE-A system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless communication systems. For clarity, the following description mainly concerns 3GPP LTE and LTE-A system, by which the technical idea of the present invention may be non-limited.

Terminologies usable in this disclosure can be defined as follows.

UMTS (universal mobile telecommunications system): a GSM (global system for mobile communication)-based $3^{rd}$ generation mobile communication technology developed by 3GPP.

EPS (evolved packet system): a network system consisting of an IP-based packet switched core network, i.e., EPC (evolved packet core) and an access network such as LTE, UTRAN and the like. The EPS is an evolved version of UMTS.

Node B: a base station of an UMTS network installed outdoors. Coverage of the Node B corresponds to a macro cell size.

eNode B: a base station of an EPS network installed outdoors. Coverage of the eNode B corresponds to a macro cell size.

User equipment: user device. The user equipment may be named a terminal, an ME (mobile equipment), an MS (mobile station) and the like. The user equipment may correspond to such a device capable of being carried as a notebook, a cellular phone, a PDA (personal digital assistant), a smartphone, a multimedia device and the like. Or, the user equipment may correspond to such a device incapable of being carried as a PC (personal computer) and a device mounted on a vehicle. In content related to MTC, the user equipment or such a terminology as user equipment may indicate MTC user equipment.

IMS (IP multimedia subsystem): a subsystem providing multimedia service based on IP.

IMSI (international mobile subscriber identity): an internationally unique user identifier allocated in a mobile communication network.

MTC (machine type communications): a communication performed by a machine without involvement of a human.

MTC user equipment (MTC UE (or MTC device)): a user equipment equipped with a communication function via a mobile communication network and performing a specific purpose (e.g., vending machine, a meter and the like).

MTC server: a server managing an MTC UE in a network. The MTC server may exist inside or outside of a mobile communication network and may have an interface accessible by an MTC user. The MTC server may provide an MTC-related service to different servers (SCS form) or the MTC server itself may correspond to an MTC application server.

MTC application: a service to which an MTC is applied (e.g., remote metering, tracing movement of supply and the like)

MTC application server: a server in which an MTC application is executed in a network.

MTC feature: a network function to support an MTC application. For instance, MTC monitoring is a feature for preparing for losing a device in an MTC application such as remote metering and the like. Low mobility is a feature for supporting an MTC application for an MTC UE such as a vending machine.

MTC subscriber: an entity having an access relationship with a network operator and providing a service to at least one MTC UE.

MTC group: a group of MTC UEs that shares at least one MTC feature and belongs to an MTC subscriber.

SCS (services capability server): an entity performing MTC-IWF (MTC interworking function) and communicating with an MTC UE in a HPLMN. The SCS accesses a 3GPP network.

External identifier: a globally unique identifier used for an external entity (e.g., SCS or application server) of a 3GPP network to indicate (or identify) an MTC UE (or a subscriber to which the MTC UE belongs). The external identifier is classified into a domain identifier and a local identifier as follows.

Domain identifier: an identifier used for identifying a domain controlled by a service provider of a mobile communication network. In order for one service provider to provide access to services different from each other, the service provider may use a different domain identifier according to a service.

Local identifier: an identifier used for inferring or obtaining IMSI (international mobile subscriber identity). The local identifier should be unique in an application domain. The local identifier is managed by a service provider of a mobile communication network.

RAN (radio access network): a unit including a Node B, an eNode B and an RNC (radio network controller) controlling the Node B and the eNode B in a 3GPP network. The RAN exists between UEs and provides a connection to a core network.

HLR (home location register)/HSS (home subscriber server): a database including subscriber information in a 3GPP network. The HSS may perform such a function as configuration storage, identity management, user state storage and the like.

RANAP (RAN application part): an interface between nodes (MME (mobility management entity)/SGSN (serving GPRS (general packet radio service) supporting node)/MSC (mobile switching center)) in charge of controlling a RAN and a core network.

PLMN (public land mobile network): a network configured to provide a service to individuals. The PLMN can be configured according to an operator.

NAS (non-access stratum): a functional layer configured to transceive a signaling and a traffic message between a UE and a core network in UMTS protocol stack. A main function of the NAS is to support mobility of the UE and a session management procedure for establishing and maintaining an IP connection between the UE and a PDN GW.

Following description is explained based on the above-mentioned terminologies.

FIG. 1 is a diagram for a schematic structure of an EPC (evolved packet core).

The EPC is an essential element of SAE (system architecture evolution) to enhance performance of 3GPP technologies. The SAE corresponds to a research subject determining a network structure supporting mobility between various types of networks. For instance, an object of the SAE is to provide an optimized packet-based system supporting various wireless access technologies based on an IP and providing more enhanced data transmission capability and the like.

Specifically, the EPC is a core network of an IP mobile communication system for a 3GPP LTE system supporting a packet-based real time and non-real time service. In a legacy mobile communication system (i.e., $2^{nd}$ generation or $3^{rd}$ generation mobile communication system), a function of the core network is implemented via 2 subdomains divided into a CS (circuit-switched) for audio and a PS (packet-switched) for data. Yet, in a 3GPP LTE system corresponding to an evolved version of the $3^{rd}$ generation mobile communication system, the subdomains of the CS and the PS are unified into a single IP domain. In particular, in the 3GPP LTE system, a connection between user equipments equipped with an IP capability can be configured via an IP-based base station (e.g., eNode B (evolved Node B)), an EPC, and an application domain (e.g., IMS). In particular, the EPC is an essential structure to implement an end-to-end IP service.

The EPC may include various configuration elements. A part of the various configuration elements including a SGW (serving gateway), a PDN GW (packet data network gateway), an MME (mobility management entity), an SGSN 9 serving GPRS (general packet radio service) supporting node), and an ePDG (enhanced packet data gateway) are depicted in FIG. 1.

The SGW operates as a boundary point between a RAN (radio access network) and a core network. The SGW is an element performing a function of maintaining a data path between an eNode B and the PDN GW. And, if a UE moves in a manner of passing through a region served by the eNode B, the SGW plays a role of a local mobility anchor point. In particular, packets can be routed via the SGW for mobility in E-UTRAN (evolved-UMTS (universal mobile telecommunications system) defined after 3GPP release-8. And, the SGW may function as an anchor point for mobility with a different 3GPP network (a RAN defined before 3GPP release-8, e.g., UTRAN or GERAN (GSM (global system for mobile communication)/EDGE (enhanced data rates for global evolution) radio access network).

The PDN GW corresponds to a termination point of a data interface heading to a packet data network. The PDN GW can support policy enforcement features, packet filtering, charging support and the like. And, the PDN GW may play a role of an anchor point for mobility management between a 3GPP network and a non-3GPP network (e.g., such an untrusted network as I-WLAN (interworking wireless local area network) and such a trusted network as a CDMA (code division multiple access) network and a Wimax).

Although an example of a network structure depicted in FIG. 1 shows that the SGW and the PDN GW are separately configured, two gateways can be implemented according to a single gateway configuration option.

The MME is an element performing signaling and control functions configured to support an access of a UE for a network connection, allocation of a network resource, tracking, paging, roaming, handover and the like. The MME controls control plane functions related to a subscriber and session management. The MME manages many eNode Bs and performs signaling for selecting a legacy gateway to make a handover to a different 2G/3G network. And, the MME performs functions such as security procedures, terminal-to-network session handling, idle terminal location management and the like.

The SGSN handles all packet data such as mobility management of a user for a different 3GPP network (e.g., GPRS network) and authentication.

The ePDG plays a role of a security node for an untrusted non-3GPP network (e.g., I-WLAN, WiFi hotspot, etc.).

As mentioned earlier with reference to FIG. 1, a UE equipped with IP capability can access an IP service network (e.g., IMS) provided by a service provide (i.e., operator) via various elements in the EPC not only based on a 3GPP access but also based on a non-3GPP access.

And, FIG. 1 shows various reference points (e.g., S1-U, S1-MME and the like). In 3GPP system, a conceptual link connecting 2 functions existing in E-UTRAN and functional entities different from each other in the EPC is defined as a reference point. Following Table 1 is a summary of the reference points depicted in FIG. 1. Besides examples shown in FIG. 1, various reference points may exist according to a structure of a network.

TABLE 1

| Reference point | description |
|---|---|
| S1-MME | Reference point for the control plane protocol between E-UTRAN and MME |
| S1-U | Reference point between E-UTRAN and serving GW for the per bearer user plane tunneling and inter eNode B path switching during handover |
| S3 | It enables user and bearer information exchange for inter 3GPP access network mobility in idle and/or active state. This reference point can be used intra-PLMN or inter-PLMN (e.g. in the case of inter-PLMN HO)). |
| S4 | It provides related control and mobility support between GPRS core and the 3GPP anchor function of serving GW. In addition, if direct tunnel is not established, it provides the user plane tunneling. |
| S5 | It provides user plane tunneling and tunnel management between serving GW and PDN GW. It is used for serving GW relocation due to UE mobility and if the serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points depicted in FIG. 1, the S2a and the S2b correspond to the non-3GPP interface. The S2a is a reference point providing related control between a trusted non-3GPP access and the PDN GW and mobility support to a user plane. The S2b is a reference point providing related control between the ePDG and the PDN GW and mobility support to the user plane.

Figure 2:
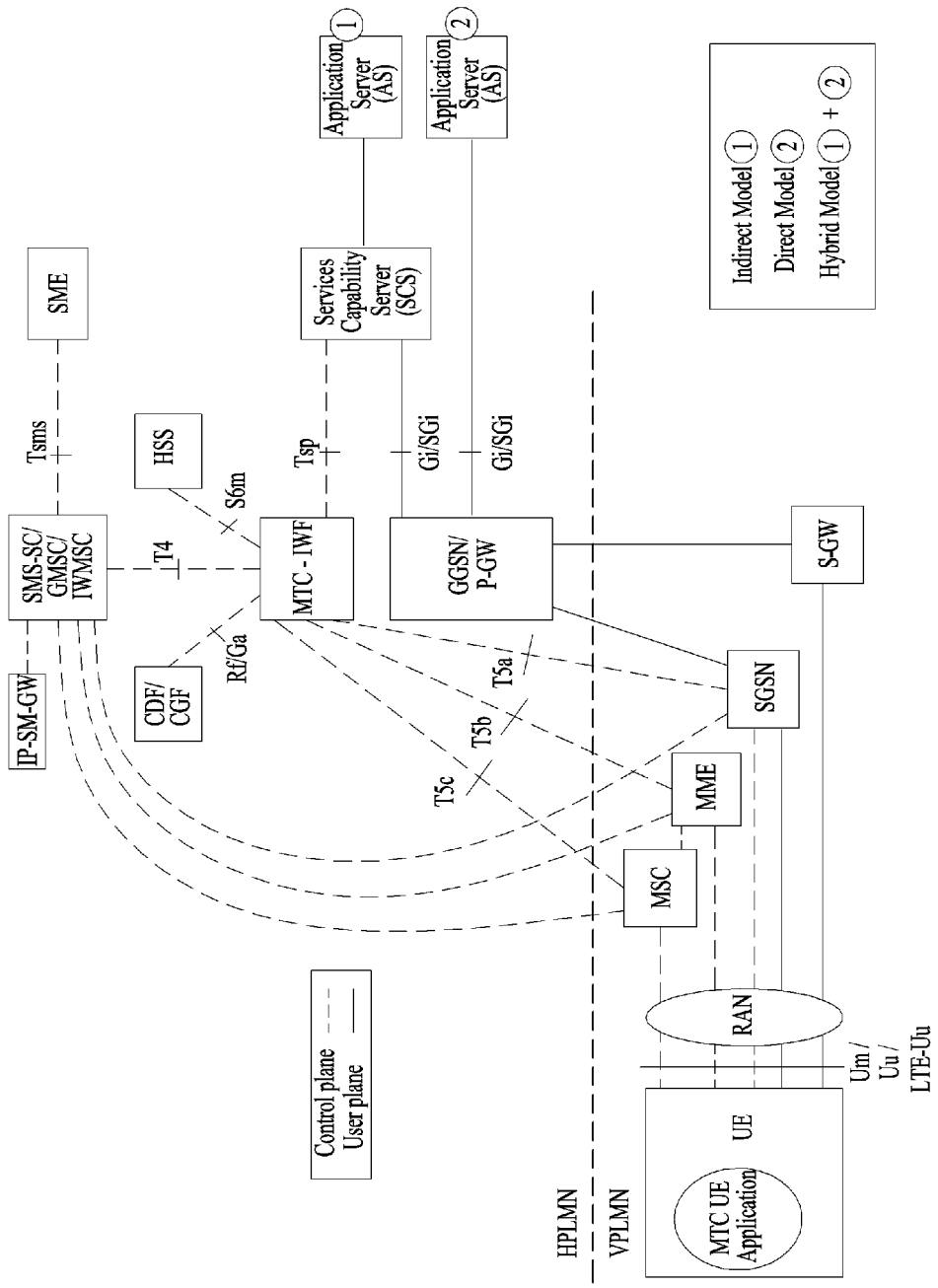
FIG. 2 is a diagram for an example of a model of an MTC structure.

FIG. 2 is a diagram for an example of a model of an MTC structure.

An end-to-end application between a UE (or MTC UE) used for an MTC and an MTC application can use services provided by a 3GPP system and selective services provided by an MTC server. The 3GPP system can provide transportation and communication services (including 3GPP bearer service, IMS and SMS) including various optimizations for enabling the MTC to be smoothly performed. FIG. 2 shows that the UE used for the MTC is connected to a 3GPP network (UTRAN, e-UTRAN, GERAN, I-WLAN, and the like) via Um/Uu/LTE-Uu interface. An architecture depicted in FIG. 2 includes various models (direct model, indirect model and hybrid model).

First of all, entities shown in FIG. 2 are explained.

In FIG. 2, an application server corresponds to a server in which an MTC application is executed in a network. The aforementioned various technologies to implement the MTC application can be applied to the MTC server. Detailed explanation on the technologies is omitted at this time. And, in FIG. 2, the MTC application server can access an MTC server via a reference point API. Detailed explanation on this is omitted. Or, the MTC application server may co-locate with the MTC server.

The MTC server (e.g., SCS server depicted in FIG. 2) is a server managing the MTC UE in the network. The MTC server can communicate with the UE used for the MTC and nodes of PLMN in a manner of being connected with the 3GPP network.

An MTC-IWF (MTC-interworking function) controls interworking between the MTC server and an operator core network and may play a role of a proxy of an MTC operation. In order to support an MTC indirect or hybrid model, at least one MTC-IWF may exist in a home PLMN (HPLMN). The MTC-IWF can make a specific function of the PLMN work in a manner of relaying or interpreting a signaling protocol on a reference point Tsp. The MTC-IWF can perform a function of authenticating the MTC server, a function of authenticating a control plane request requested by the MTC server, various functions related to a trigger indication, which is described later, and the like before the MTC server establishes a communication with the 3GPP network.

An SMS-SC (short message service-service center)/IP-SM-GW (internet protocol short message gateway) can manage transmission and reception of an SMS (short message service). The SMS-SC may be in charge of relaying a short message between an SME (short message entity) (an entity transmitting or receiving a short message) and a mobile station and performing a function of storing-and-delivering the short message. The IP-SM-GW may be in charge of a protocol interworking between an IP-based UE and the SMS-SC.

A CDF (charging data function)/CGF (charging gateway function) may perform an operation related to charging.

An HLR/HSS may perform a function of storing subscriber information (IMSI and the like), routing information, configuration information and the like and a function of providing the informations to the MTC-IWF.

An MSC/SGSN/MME can perform such a control function as mobility management for network connection of a UE, authentication, resource allocation, and the like. In relation to a triggering described later, the MSC/SGSN/MME receives a trigger indication from the MTC-IWF and can perform a function of processing the trigger indication into a form of a message provided to the MTC UE.

A GGSN (gateway GPRS support node)/S-GW (serving gateway)+P-GW (packet data network-gateway) can perform a function of a gateway taking charge of establishing a connection between a core network and an external network.

Following Table 2 is a summary of the main reference points depicted in FIG. 2.

TABLE 2

| Reference point | Description |
| --- | --- |
| Tsms | It is the reference point an entity outside the 3GPP system used to communicate with UEs used for MTC via SMS. |
| Tsp | It is the reference point an entity outside the 3GPP system uses to communicate with the MTC-IWF related control plane signaling. |
| T4 | Reference point used by MTC-IWF to route device trigger to the SMS-SC in the HPLMN. |
| T5a | Reference point used between MTC-IWF and serving SGSN. |
| T5b | Reference point used between MTC-IWH and serving MME. |
| T5c | Reference point used between MTC-IWF and serving MSC. |
| S6m | Reference point used by MTC-IWF to interrogate HSS/HLR for E.164 MSISDN or external identifier mapping to IMSI and gather UE reachability and configuration information. |

Among the aforementioned T5a, T5b, and T5c, at least one reference point is called a T5.

Meanwhile, a user plane communication with the MTC server in case of the indirect and the hybrid model and a communication with the MTC application server in case of the direct and the hybrid model can be performed using a legacy protocol via a reference point Gi and SGi.

Detailed items related to the content described in FIG. 2 can be incorporated in the present specification by referring to 3GPP TS 23.682 document.

In case of performing an MTC, it is expected that a plurality of MTC UEs greater than a general user device in number exist in a network. Hence, in order to perform the MTC, it is required to use a minimum network resource, a minimum signaling, a minimum power, and the like.

And, in order for an MTC UE to minimally use a system resource, the MTC UE may not establish an IP connection with an MTC application server in an ordinary time. If the MTC application server fails to transmit data to the MTC UE since the MTC UE does not establish the IP connection, the MTC application server can request or indicate the MTC UE to establish the IP connection. This is called a trigger indication. In particular, MTC UE triggering is requested when an IP address of the MTC UE is not available by the MTC application server or is not reachable to the MTC application server (when an entity or an address of the entity is not reachable, it means that a try to deliver a message fails due to such a reason as an absence of the entity in the address and the like). To this end, the MTC UE can receive the trigger indication from a network. Having received the trigger indication, the MTC UE performs an operation of an MTC application within the MTC UE or the MTC UE is requested to establish a communication with the MTV application server. In this case, when the MTC UE receives the trigger indication, it may assume following 3 cases, a) the MTC UE is offline (the MTC UE is not attached to the network), b) the MTC UE is online (the MTC UE is attached to the network) but data connection is not established, or c) the MTC UE is online (the MTC UE is attached to the network) and the data connection is established.

For instance, when an IP connection (or PDN connection) capable of receiving data from the MTC application server is not established (or when the MTC UE can receive a basic control signal but cannot receive user data), the triggering for the MTC UE may correspond that the MTC UE performs an operation of the MTC application within the MTC UE using a triggering message and/or an operation making the MTC UE request an IP connection request to the MTC application server. And, the triggering message can be represented as a message including information (hereinafter called triggering information) for enabling a network to route the message to a suitable MTC UE and the information for enabling the MTC UE to route the message to a suitable application within the MTC UE.

Figure 3:
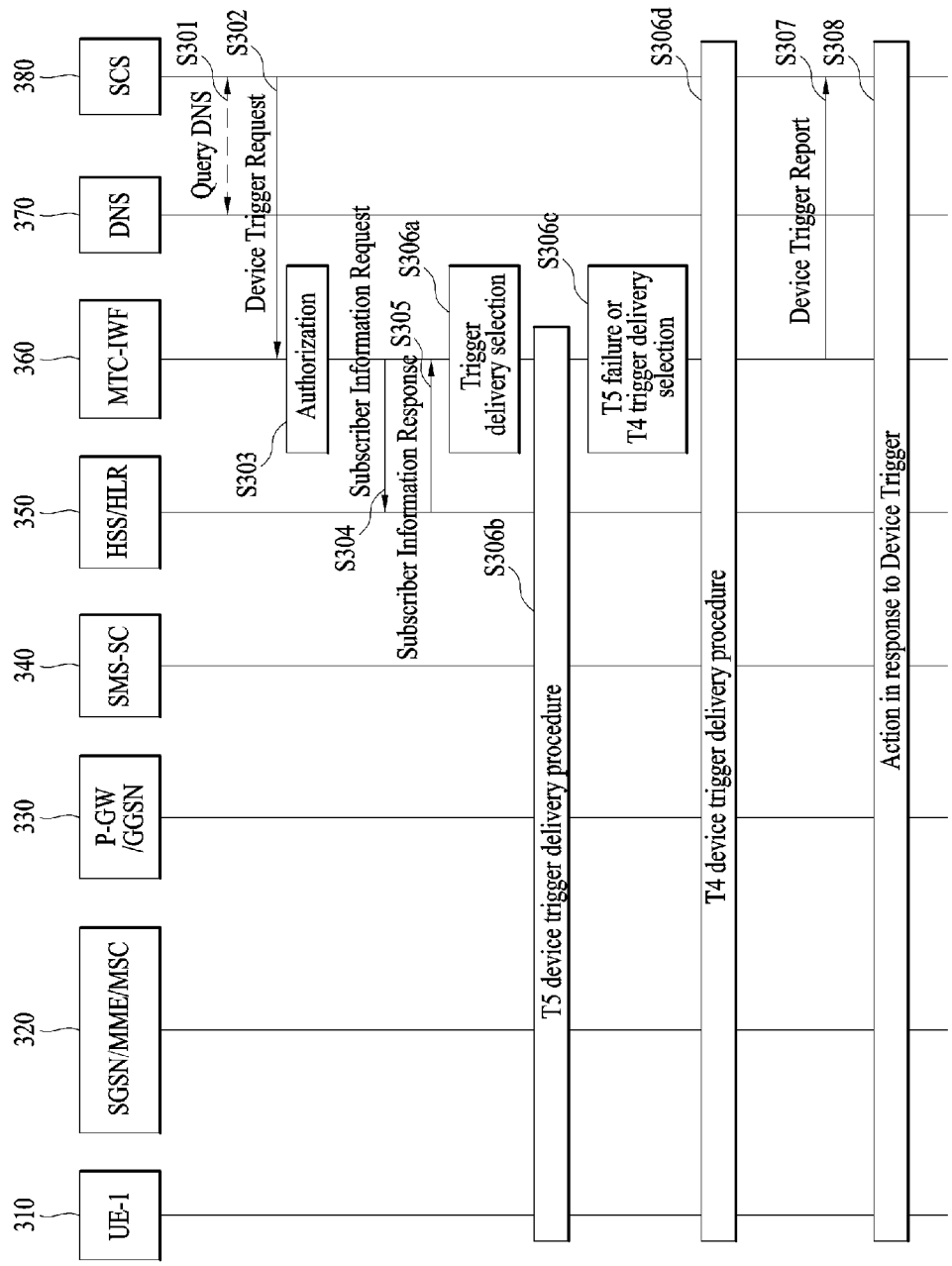
FIG. 3 is a diagram for explaining a trigger delivery procedure of an MTV device.

More specific MTC triggering procedures are explained with reference to FIG. 3.

The SCS 380 can determine to trigger the MTC UE [S301]. If there is no information on the MTC-IWF contacted by the SCS to make a request for triggering, an IP address or a port number of the MTC-IWF can be determined by performing a DNS query to a DNS 370 using an external identifier of the MTC UE to be triggered or an identifier of the MTC-IWF configured within the SCS. Subsequently, the SCS 380 transmits a device trigger request message to the MTC-IWF 360 [S302]. The device trigger request message can include information listed in a following Table 3.

TABLE 3 i) external identifier or MSISDN: an identifier of an MTC UE (or a subscriber to which the MTC UE belongs) to be triggered
ii) SCS identifier: an identifier of the SCS transmitting the device trigger request message
iii) trigger reference number: a reference number of the transmitted device trigger request message
iv) validity period: a time period for which the device trigger request is valid. If a trigger is not delivered to the MTC UE, a network entity (e.g., MTC-IWF) informs a period of storing the device trigger request
v) priority: priority of delivering the device trigger request
vi) trigger payload: information delivered to MTC application within the MTC UE Having received the device trigger request message from the SCS 380, the MTC-IWF 360 performs authorization verification for whether a trigger request transmitted to a 3GPP network by the SCS is permitted [S303]. If the authorization verification fails, the MTC-IWF 360 transmits a device trigger confirmation message indicating that the device trigger request has failed to the SCS 380. On the contrary, if the authorization verification successes, a next step can be performed.

The MTC-IWF 360 transmits a subscriber information request message to HSS/HLR 350 [S304]. The subscriber information request message is transmitted to check whether the SCS is permitted to trigger the MTC UE, to obtain IMSI using the identifier of the MTC UE received in the step S302, and to obtain routing information including an identifier of a serving node that serves the MTC UE.

The HSS/HLR 350 checks whether the SCS, which has transmitted the device trigger request message, corresponds to the SCS permitted to trigger the MTC UE [S305].

Subsequently, the HSS/HLR 350 transmits a subscriber information response message to the MTC-IWF 360. The subscriber information response message includes an identifier of the IMSI and an identifier of the serving node that serves the MTC UE. As a result of the checking, if the SCS is not permitted to trigger the MTC UE or if there is no valid subscription information related to the MTC UE in the HSS/HLR 350, the HSS/HLR 350 transmits a subscriber information response message including information on the aforementioned content to the MTC-IWF 360. In this case, the MTC-IWF 360 transmits a device trigger confirmation message indicating that the device trigger request has failed to the SCS 380 and does not perform following steps.

The MTC-IWF 360 selects a trigger delivery procedure based on the information received from the HSS/HLR 350 and a local policy [S306a].

If a delivery procedure using a T5 is selected, the MTC-IWF 360 performs a T5 trigger delivery procedure [S306b]. Detailed explanation on the T5 trigger delivery procedure is described later with reference to FIG. 4. If a delivery procedure using a T4 is selected in the step S306a or if the T5 delivery fails in the step S306b, the MTC-IWF 360 performs a T4 trigger delivery procedure [S306c to S306d]. Detailed explanation on the T4 trigger delivery procedure is described later with reference to FIG. 5.

The MTC-IWF 360 transmits a device trigger report message to the SCS 380 in response to the device trigger request message in the step S302 [S307]. The device trigger report message indicates whether a trigger delivery to the MTC UE is successful in response to the device trigger requested by the SCS.

As a response to the received device trigger, a UE-1 performs an operation based on content of a trigger payload. The operation typically includes initiation of a communication with the SCS or an AS (application server).

Figure 4:
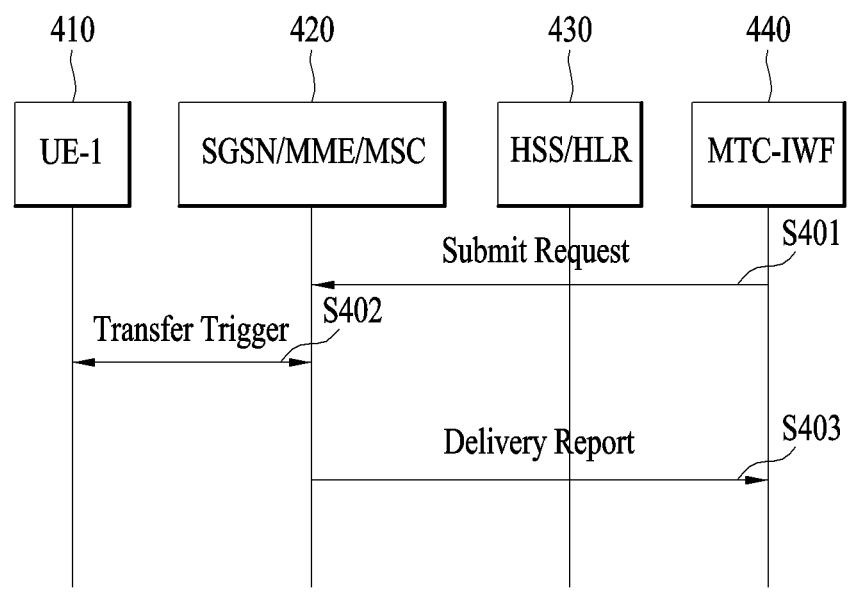
FIG. 4 is a diagram for explaining a trigger delivery procedure using a T5.

FIG. 4 is a diagram for explaining a T5 trigger delivery procedure. If the MTC-IWF receives a device trigger request from the SCS in the step S302 of FIG. 3, the MTC-IWF selects an appropriate trigger delivery procedure based on information received from the HSS/HLR and a local policy [S304 to S306a in FIG. 3]. As a result, the MTC-IWF can transmit a device trigger request to the SGSN via a T5a interface, can transmit the device trigger request to the MME via a T5b interface, can transmit the device trigger request to the MSC via a T5c interface (the device trigger via T5a, the T5b, and the T5c can be called a T5 device trigger), or can transmit the device trigger request to the SMS-SC via a T4 interface. For instance, referring to FIG. 4, if there are a plurality of available serving nodes based on information obtained from the HSS/HLR, the MTC-IWF 440 selects an appropriate serving node. The MTC-IWF 440 transmits a submit request message to the selected serving node [S401]. As mentioned in the foregoing description, if the selected serving node corresponds to the SGSN, the MTC-IWF 440 transmits the submit request message via the T5a interface, If the selected serving node corresponds to the MME, the MTC-IWF 440 transmits the submit request message via the T5b interface, or if the selected serving node corresponds to the MSC, the MTC-IWF 440 transmits the submit request message via the T5c interface.

Having received the submit request message, the serving node 420 delivers a trigger message to the UE-1 410 corresponding to a target UE of the device trigger [S402]. Having performed the trigger operation, the serving node 420 transmits a delivery report message to the MTC-IWF 460. The delivery report message indicates whether the trigger delivery to the MTC UE is successful in response to the device trigger requested by the MTC-IWF.

Figure 5:
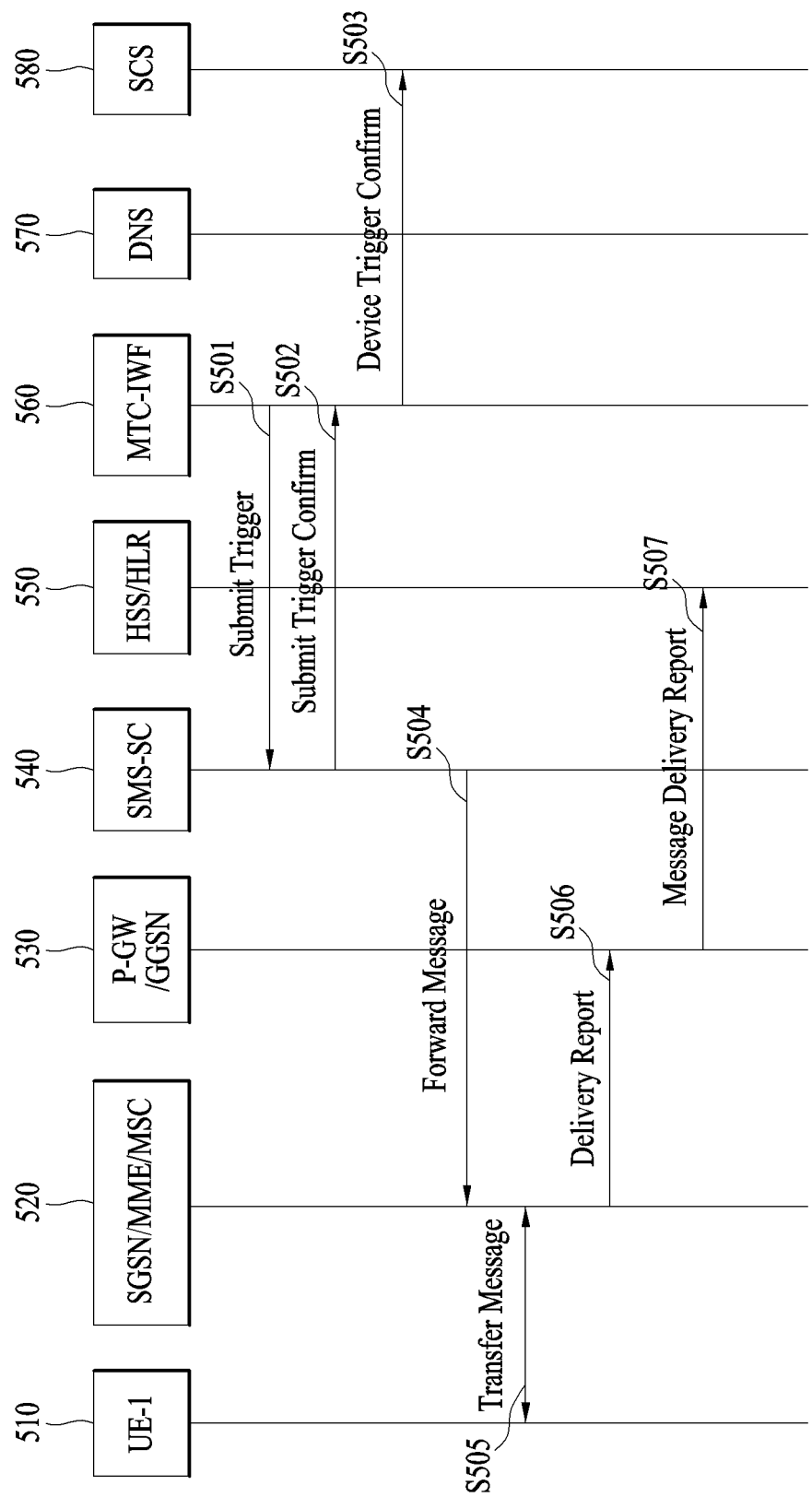
FIG. 5 is a diagram for explaining a trigger delivery procedure using a T4.

FIG. 5 is a diagram for explaining a T4 trigger delivery procedure. Referring to FIG. 5, the MTC-IWF 560 transmits a submit trigger message to the SMS-SC 540 based on information included in the device trigger request message received from the SCS 580 and information included in the subscriber information response message received from the HSS/HLR 550 [S501]. The SMS-SC 540 transmits a submit trigger confirmation message indicating that the SMS-SC has accepted the submit trigger message to the MTC-IWF 560 [S502]. Having received the submit trigger confirmation message from the SMS-SC 540, the MTC-IWF 560 transmits a device trigger confirmation message indicating that the MTC-IWF has accepted the device trigger request message transmitted by the SCS to the SCS 580 [S503].

A short message including the device trigger message transmitted by the SMS-SC 540 is delivered to the serving node 520 [S504]. In this case, if the received device trigger message includes routing information (information on the serving node), the SMS-SC 540 does not need to perform interrogation with the HSS/HLR 550 to obtain the routing information. The SMS-SC 540 stores necessary information among the information received from the MTC-IWF 560 except the routing information in preparation for a case that a short message transmission fails.

Subsequently, the serving node 520 delivers the short message to the UE-1 510 [S505]. Having received the short message including the device trigger message, the UE-1 510 may respond to the serving node 520. The serving node 520 transmits a delivery report message to the SMS-SC 540 [S506]. The delivery report message may indicate whether the delivery of the short message delivered to the MTC UE is successful in response to the delivery of the short message requested by the SMS-SC. If the delivery of the short message fails, the SMS-SC 540 obtains routing information in a manner of performing the interrogation with the HSS/HLR 550 to deliver the short message to the UE-1 510 and may be then able to perform re-transmission using the information stored in the step S504. The SMS-SC 540 transmits a message delivery report to the MTC-IWF 560 to indicate whether the trigger delivery to the MTC UE is successful in response to the device trigger requested by the MTC IWF [S507].

As mentioned in the foregoing description, a trigger request in a network can be tried by various paths and/or various device trigger delivery mechanisms. In particular, as one of many factors used for determining (when a specific mechanism is determined, it may be comprehended as such a trigger delivery path as T4, T5a, T5b, T5c and the like is also determined) an appropriate path and/or a trigger mechanism by the MTC-IWF, there may exist information on a trigger delivery supported by the MTC UE, i.e., trigger delivery mechanism information. Yet, according to a related art, it has not been defined how the MTC-IWF obtains the trigger delivery mechanism information yet. And, it has not been defined how the MTC-IWF obtains the trigger delivery mechanism supported by a serving node. If the MTC-IWF determines the trigger delivery mechanism without the information on the trigger delivery supported by the MTC UE or the serving node, success rate of the trigger delivery is lowered and time delay increases due to retransmission of a trigger, thereby causing waste of a network resource.

Hence, the present invention proposes various methods capable of obtaining the information on the trigger delivery by a network (e.g., MTC-IWF). In particular, when the MTC-IWF determines the trigger path and/or the trigger delivery mechanism, the information can be used.

When the MTC-IWF determines (if a first trigger fails, it also includes a selection for a retry) the trigger path and/or the trigger delivery mechanism, it may use informations listed in Table 4 in the following.

TABLE 4

Information on a serving node of a current MTC UE received from HSS/HLR
Trigger delivery mechanism supported by MTC UE
Available trigger delivery service supported by HPLMN (in case of roaming, VPLMN)
MNO device trigger delivery policy
Information received from MTC server In addition to the informations in Table 4, informations listed in Table 5 in the following can be used when the MTC-IWF determines the trigger path and/or the trigger mechanism in the present invention.

TABLE 5

Capability information of MTC UE (to perform trigger delivery mechanism supported by MTC UE)
Enable/disable information of an individual delivery mechanism
Information on a UE and a serving node, which is collected/judged/processed by MME In Table 5, the capability information of the MTC UE can include i) various trigger delivery mechanism (T4, T5a, T5b, T5c or SMS), ii) access domain (e.g., PS, CS or IMS) accessible by the MTC UE depending on hardware characteristic of the MTC UE or a current environment, iii) capability information of the MTC UE (CS/PS supportive MTC UE, PS-only supportive MTC UE, MSISDN-less MTC UE, etc.), iv) preference, priority/weight and restriction information of the MTC UE (or MTC subscriber), v) history information and the like.

In this case, the preference, the priority/weight and the restriction information may relate to a domain, a network node, and a trigger delivery mechanism. Specifically, domain preference may indicate information on at least one preferred domain based on the capability of the MTC UE or a selected payment plan. The priority/weight may indicate information on a relative weight or priority between many domains. The domain restriction may indicate information on a domain intended to be restricted based on the capability of a UE or a payment plan. If there are two or more serving nodes in case of an online trigger, preference of the network node may indicate information on a serving node preferred by the MTC UE together with addresses of the two or more serving nodes. The priority/weight and the restriction of the network node may indicate information on a node intended to be restricted based on priority/weight information between various serving nodes and/or network nodes, the capability of the MTC UE, or a selected payment plan. The preference of the trigger delivery mechanism may indicate a preferred trigger delivery mechanism based on the capability of the MTC UE, a selected payment plan, or the like. For instance, when both an SMS and a user plane based trigger are available to the MTC UE, if preference information prefers the SMS, the preference of the trigger delivery mechanism may indicate information on the SMS together. The priority/weight and the restriction of the trigger delivery mechanism may indicate information on a trigger delivery mechanism intended to be restricted based on priority/ weight information between various trigger delivery mechanisms, the capability of the MTC UE, or a selected payment plan.

And, the history information may correspond to information on whether a trigger delivery is succeeded, success/ failure path, success rate/failure rate, or the number of success/the number of failure for a latest or a predetermined duration. In this case, the above-mentioned informations on success/failure mentioned may relate to the domain, the network node, or the trigger delivery mechanism.

As mentioned in the foregoing description, the capability information of the MTC UE, which is usable when the MTC-IWF determines the trigger path and/or the trigger mechanism, can be obtained by the MTC-IWF according to various embodiments described in the following.

Embodiment 1

When the MTC UE transmits such a control signal as an attach to a network, TAU (tracking area update) or LAU (location area update), the MTC UE can transmit capability information including information on MTC trigger delivery together with the control signal.

Having received the above-mentioned information from the MTC UE, a serving node can transmit the information to the HSS/HLR as it is or by processing the information. The HSS/HLR stores the informations and may be then able to deliver the informations to the MTC-IWF in case of performing interaction with the MTC-IWF.

Examples of the aforementioned content are described in the following.

Prior to an attach request message, the MTC UE can transmit the informations listed in Table 4 and Table 5 to the serving node (following description is explained on the basis of an MME which is one of the serving nodes). The MTC UE can include the information for each of T5a, T5b, and T5c trigger delivery mechanism or can include the information in an integrated form. And, information on the T5b trigger delivery mechanism can be included in the control message only which is transmitted to the MME. Or, all informations (e.g., information on T5a and information on T5c) possessed by the MTC UE in relation to T5 can be included in the control message.

As a method of including the informations listed in Table 4 and Table 5 in the attach request message, it is able to utilize a specific parameter (e.g., UE network capability, MS network capability) among parameters of a legacy attach request message shown in Table 6 or it is able to deliver information in a manner of adding a new parameter to the attach request message.

TABLE 6

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Attach request message identity | Message type 9.8 | M | V | 1 |
| | EPS attach type | EPS attach type 9.9.3.11 | M | V | ½ |
| | NAS key set identifier | NAS key set identifier 9.9.3.21 | M | V | ½ |
| | EPS mobile identity | EPS mobile identity 9.9.3.12 | M | LV | 5-12 |

TABLE 6-continued

| IEI | Information Element | Type/Reference | Presence | Format | Length |
|---|---|---|---|---|---|
| | UE network capability | UE network capability 9.9.3.34 | M | LV | 3-14 |
| | ESM message container | ESM message container 9.9.3.15 | M | LV-E | 5-n |
| 19 | Old P-TMSI signature | P-TMSI signature 10.5.5.8 | O | TV | 4 |
| 50 | Additional GUTI | EPS mobile identity 9.9.3.12 | O | TLV | 13 |
| 52 | Last visited registered TAI | Tracking area identity 9.9.3.32 | O | TV | 6 |
| 5C | DRX parameter | DRX parameter 9.9.3.8 | O | TV | 3 |
| 31 | MS network capability | MS network capability 9.9.3.20 | O | TLV | 4-10 |
| 13 | Old location area identification | Location area identification 9.9.2.2 | O | TV | 6 |
| 9- | TMSI status | TMSI status 9.9.3.31 | O | TV | 1 |
| 11 | Mobile station classmark 2 | Mobile station classmark 2 9.9.2.4 | O | TLV | 5 |
| 20 | Mobile station classmark 3 | Mobile station classmark 3 9.9.2.5 | O | TLV | 2-34 |
| 40 | Supported Codecs | Supported Codec List 9.9.2.10 | O | TLV | 5-n |
| F- | Additional update type | Additional update type 9.9.3.0B | O | TV | 1 |
| 5D | Voice domain preference and UE's usage setting | Voice domain preference and UE's usage setting 9.9.3.44 | O | TLV | 3 |
| D- | Device properties | Device properties 9.9.2.0A | O | TV | 1 |
| E- | Old GUTI type | GUTI type 9.9.3.45 | O | TV | 1 |

The MME can transmit information received from the MTC UE to the HSS. In this case, transmission to the HSS can be performed via an update location request message, by which the present invention may be non-limited. The transmission to the HSS can be performed by interaction with the HSS in an authentication process as well.

In particular, the information received from the MTC UE can be delivered to the HSS as it is without being processed in the MME. Or, information processed by a mixture of various informations can be delivered to the HSS. For instance, it is able to infer a supportable trigger mechanism based on information on the MTC UE including the MTC UE capability information received from the MTC UE and other information (information on a serving node). Or, a result of the inferring can be transmitted to the HSS only.

If the information received from the MTC UE corresponds to information on the supportable trigger mechanism, the information can be transmitted to the HSS as it is. If information on an individual delivery mechanism or enable/disable information of capability of an individual MTC UE is received, the information can be directly delivered to the HSS or information (or a result value) processed by the MME can be delivered to the HSS.

In addition, the information received from the UE can be processed by the MME in a manner of considering network capability known by the MME or identifiable by the MME. For instance, despite a capability or a trigger mechanism is capable of being supported by the UE, if the capability or the trigger mechanism is not supported by a current network, information on the UE and information on the network can be delivered to the HSS together. Or, information of a different form processed by the MME can be delivered to the HSS.

In particular, the MME can transmit the information on the MTC UE and the information on the trigger delivery of the MME to the HSS based on the information received from the MTC UE, information possessed by the MME, information received from a node of a third network, and the like.

In the aforementioned description, processing of the MME, which processes the information received from the MTC UE, is explained in detail. The information processing of the MME can be comprehended as determining whether information on T5 trigger delivery is transmitted to the HSS. The processing of the received information may correspond to at least one (independent or combination) of the following cases.

First of all, if the MTC UE is not equipped with a T5 trigger capability, the MME may not transmit information on a trigger delivery to the HSS despite the MME is equipped with the T5 trigger capability. Specifically, in case that there exist a membership (level) and expire time for a subscriber or the MTC UE belonging to a specific group, the processing of the received information can be performed if the MTC UE does not correspond to a valid subscriber or a valid MTC UE capable of receiving a T5 trigger or if the expire time elapses.

Secondly, when the MTC UE corresponds to a roaming UE, if the MTC UE cannot receive a T5 trigger in a current PLMN based on a roaming agreement, the MME may not transmit the information on the trigger delivery to the HSS.

Thirdly, when the MTC UE corresponds to a roaming UE, if the MTC UE cannot receive a current T5 trigger based on a local policy, the MME may not transmit the information on the trigger delivery to the HSS.

Fourthly, when the MME does not want to or cannot process a T5 trigger irrespective of a capability of the MTC UE due to occurrence of a congestion status, the MME may not transmit the information on the trigger delivery to the HSS.

Fifthly, when the MME does not want to process a T5 trigger irrespective of a capability of the MTC UE since the MME can expect that a congestion status will soon occur, the MME may not transmit the information on the trigger delivery to the HSS.

Sixthly, when the MME wants to maintain a unified trigger mechanism if possible, since a majority of UEs controlled by the MME are currently processed by a specific trigger mechanism, the MME may not transmit the information on the trigger delivery to the HSS. For instance, if the T5 trigger is used for a trigger request to a different UE attached to the MME, the MME may transmit the information on the trigger delivery to the HSS.

Seventhly, when a T5 trigger mechanism capability is currently disabled on a specific time by information predetermined by the MME, the MME may not transmit the information on the trigger delivery to the HSS.

Eighthly, when the MME determines that the MTC UE can receive a trigger by a different method and the MME does not want to process a T5 trigger if possible, the MME may not transmit the information on the trigger delivery to the HSS. For instance, the processing of the received information may correspond to a case that an MSC as well as the MME is available for the MTC UE since the MTC UE performs a combined attach.

Continuously, the MME can transmit at least one of the informations described in the following to the HSS.

i) a part or all of the capability informations of the MTC UE received from the MTC UE or information in which the capability information is processed ii) capability information on a T5 trigger delivery supported by the MME (enable/disable state of the capability can be transmitted together)

iii) statistical information on a current congestion status and trigger delivery of the MME iv) current preference for a T5 trigger delivery mechanism of the MME The MME can transmit the aforementioned informations to the HSS in a manner of reprocessing the informations in an integrated form.

In this case, the aforementioned informations, which are transmitted to the HSS by the MME, can be delivered in a manner that a new parameter is added to a location update request message. For instance, a parameter similar to the location update request message 'UE-SRVCC-capability', which may refer to TS 29.272, can be added to deliver the aforementioned informations. The location update request message may correspond to the step S604 in FIG. 6 which shows an example of an EPS access procedure.

Figure 6:
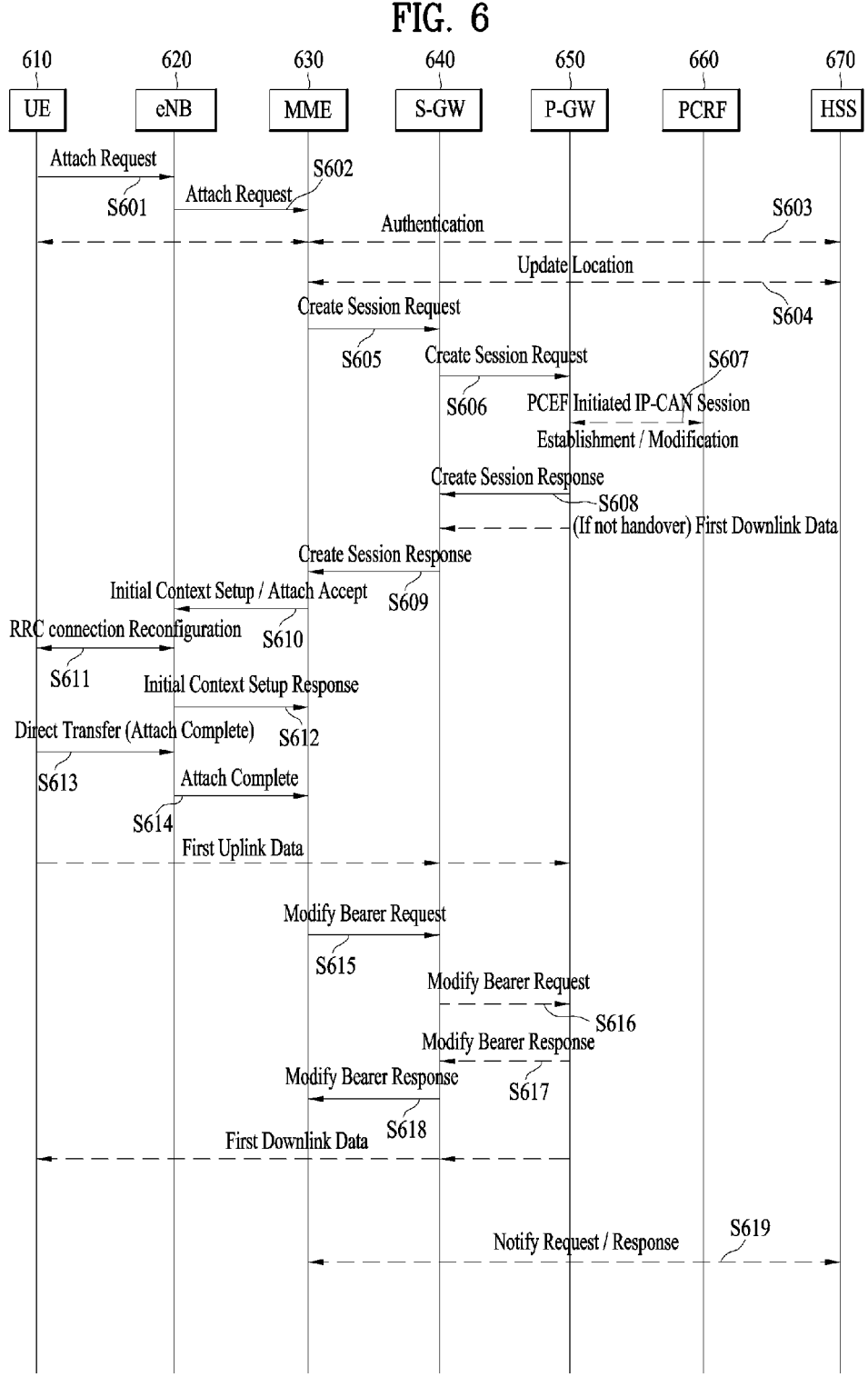
FIG. 6 and FIG. 7 are diagrams for explaining a timing of information delivery according to embodiment of the present invention.

Or, the aforementioned informations can be transmitted to the HSS via a notify request message corresponding to the step S619 in FIG. 6.

Or, an update message, which reflects a current status of the MME, can be transmitted to the HSS by generating a new message. For instance, if a congestion status of the MME is resolved, the MME can update the information on a trigger in a manner of judging and processing information based on the information received from the MTC UE and the information reflecting the current status. In this case, the HSS may notify the MTC-IWF that the information on the trigger has changed.

Figure 7:
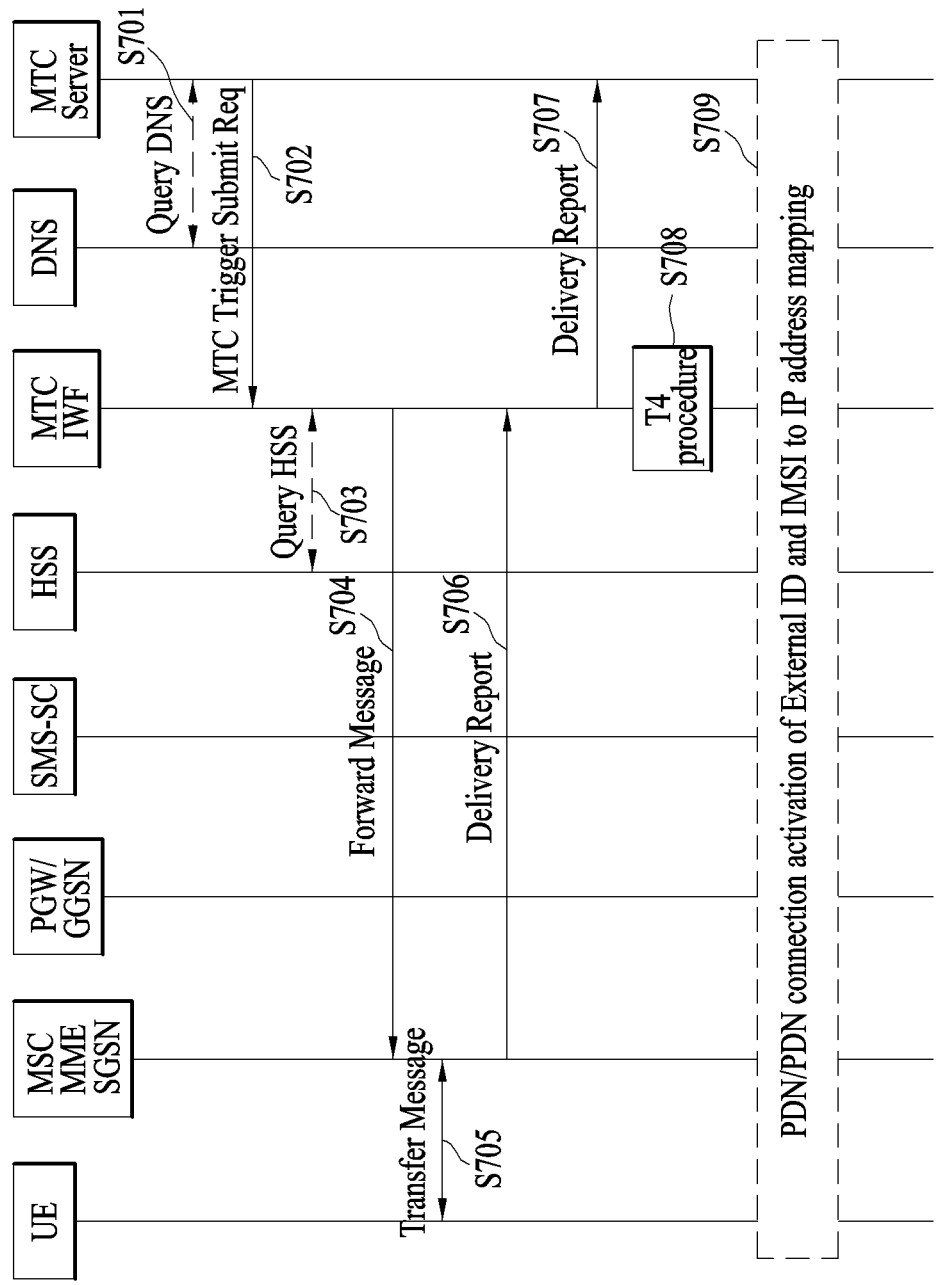

The aforementioned informations transmitted to the HSS are stored in the HSS and may be then able to deliver to the MCT-IWF. In this case, the aforementioned informations can be stored in the HSS in a form similar to 'UW-SRVCC-capability' included in 'HSS data', which may refer to TS.23.401. And, the information stored in the HSS can be delivered to the MTC-IWF via a 'Query HSS' procedure in the step S703 of the MTC triggering procedure shown in FIG. 7. If information is stored via interaction between a previous HSS and the MTC-IWF, it is not necessary to perform the 'Query HSS' procedure all the time.

Embodiment 2

The informations, which are listed in Table 4 and Table 5, are statically stored in subscriber information and the MTC-IWF can obtain the informations when interaction between the MTC-IWF and the HSS is performed. In this case, the informations stored in the subscriber information can be stored in a manner of being included in a specific field of subscription data of TS 29.272. Or, a new field (e.g., '[MTC-device trigger-subscription-data]' is defined and the new field can be used for storing the informations. Following Table 7 shows an example of the subscription data when the new field is defined.

TABLE 7

[ Subscriber-Status ]
[ MSISDN ]
[ STN-SR ]
[ ICS-Indicator ]
[ Network-Access-Mode ]
[ Operator-Determined-Barring ]
[ HPLMN-ODB ]
*10[ Regional-Subscription-Zone-Code]
[ Access-Restriction-Data ]

TABLE 7-continued

[ APN-OI-Replacement ]
[ LCS-Info ]
[ Teleservice-List ]
[ Call-Barring-Infor-List ]
[ 3GPP-Charging-Characteristics ]
[ AMBR ]
[ APN-Configuration-Profile ]
[ RAT-Frequency-Selection-Priority-ID ]
[ Trace-Data]
[ GPRS-Subscription-Data ]
*[ CSG-Subscription-Data ]
[ MTC-device trigger-Subscription-Data ] // 새로 추가
[ Roaming-Restricted-Due-To-Unsupported-Feature ]
[ Subscribed-Periodic-RAU-TAU-Timer ]
[ MPS-Priority ]
[ VPLMN-LIPA-Allowed ]
[ Relay-Node-Indicator ]
[ MDT-User-Consent ]
[ Subscribed-VSRVCC ]
*[ AVP ]

Embodiment 3

The informations mentioned in Table 4 and Table 5 can be delivered by a direct communication between the MTC UE and the MTC-IWF.

As an example of the direct communication, the MTC UE can deliver the informations to the MTC-IWF using such a scheme as an OMA DM/OTA and the like. Or, an internet browsing scheme can enable the MTC UE to directly store/update the information.

Embodiment 4

The informations are stored in an MTC-server/application by a direct communication between the MTC UE/a manager of a corresponding service and the MTC server. The informations mentioned in Table 4 and Table 5 can be received together when the MTC-IWF receives information from the MTC-server/application. In this case, an internet browsing scheme can enable the MTC UE/the manager of a corresponding service to directly store/update the information in the MTC-server/application.

In the foregoing description, in particular, in case of the embodiment 1, it may be comprehended as the serving node determines a trigger delivery mechanism based on the MTC UE capability instead of determining the trigger mechanism by the MTC-IWF.

And, in the foregoing description, when the trigger delivery mechanism is determined, it is able to additionally consider subscriber information, a service provider policy, capability of a network node related to a trigger delivery, preference of H/VPLMN and the like.

The aforementioned items explained in various embodiments of the present invention can be implemented in a manner of being independently applied or in a manner that two or more embodiments are simultaneously applied.

Figure 8:
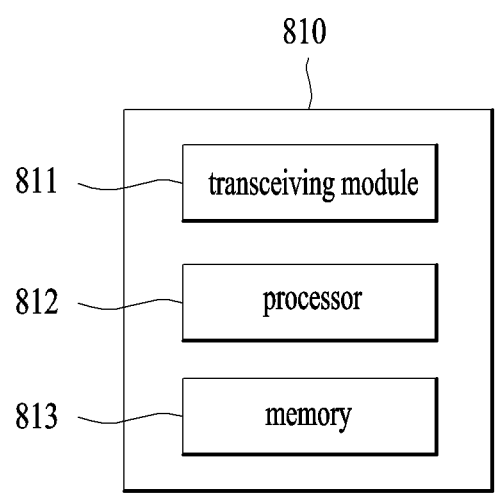
FIG. 8 is a diagram for a device configuration according to embodiment of the present invention.

FIG. 8 is a diagram for a configuration of a user equipment device and a network node device according to one embodiment of the present invention.

Referring to FIG. 8, a serving node device 810 according to one embodiment of the present invention can include a transceiving module 811, a processor 812 and a memory 813. The transceiving module can be configured to transmit various signals, data, and information to an external device (the network node 820 and/or a server device (not depicted)) and can be configured to receive various signals, data, and information from the external device (the network node 820 and/or a server device (not depicted)). The processor 812 can control overall operations of the serving node device 810 and can be configured to perform a function of calculating information, which is to be transceived with the external device, and the like. The memory 813 can store the calculated information and the like for a prescribed time and can be replaced with such a configuration element as a buffer (not depicted)

The processor of the serving node 810 according to one embodiment of the present invention receives capability information including information on a trigger delivery from a user equipment and determines whether to transmit the information on the trigger delivery to an HSS (home subscriber server)/HLR (home location register) based on information on the user equipment, which includes the capability information, and information on the serving node. The information on the trigger delivery can include information on whether the user equipment supports a trigger request via the MTC-IWF and the serving node.

Detail configuration of the aforementioned serving node 810 can be implemented in a manner that the aforementioned items explained in various embodiments of the present invention are independently applied or two or more embodiments are simultaneously applied. For clarity, explanation on the duplicated contents is omitted.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

Detailed explanation on the preferred embodiment of the present invention disclosed as mentioned in the foregoing description is provided for those in the art to implement and execute the present invention. While the present invention has been described and illustrated herein with reference to the preferred embodiments thereof, it will be apparent to those skilled in the art that various modifications and variations can be made therein without departing from the spirit and scope of the invention. For instance, those skilled in the art can use each component described in the aforementioned embodiments in a manner of combining it with each other. Hence, the present invention may be non-limited to the aforementioned embodiments of the present invention and intends to provide a scope matched with principles and new characteristics disclosed in the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The aforementioned embodiments of the present invention can be applied to various mobile communication systems.

What is claimed is:

1. A method of supporting a trigger request of an MTC-IWF (machine type communication-interworking function), which is supported by a serving node in a wireless communication system, the method comprising:
   receiving capability information comprising trigger delivery information from a user equipment via a direct communication between the user equipment and the MTC-IWF, wherein the trigger delivery information indicates whether the user equipment supports the trigger request via the MTC-IWF and the serving node;
   determining whether to transmit the trigger delivery information to a network entity based on information on the user equipment including the capability information and information on the serving node, wherein the network entity is an HSS (home subscriber server) or an HLR (home location register); and
   determining a trigger delivery mechanism among a plurality of trigger delivery mechanisms based on the capability information,
   wherein the capability information further comprises preferences for each of the plurality of trigger delivery mechanisms based on a payment plan of the user equipment, and
   wherein the plurality of trigger delivery mechanisms consist of a T5a trigger mechanism using a reference point between the MTC-IWF and a SGSN (serving GPRS (general packet radio service) supporting node), a T5b trigger mechanism using a reference point between the MTC-IWF and a serving MME (mobility management entity), and a T5c trigger mechanism using a reference point between the MTC-IWF and a serving MSC (mobile switching center).

2. The method of claim 1, wherein the information on the user equipment further comprises whether the user equipment corresponds to a roaming user equipment and wherein the information on the serving node comprises at least one of congestion status information of the serving node or capability information of the serving node on a triggering.

3. The method of claim 1, wherein if the user equipment supports the trigger request via the MTC-IWF and the serving node and if the user equipment corresponds to a roaming user equipment, the serving node determines whether to transmit the trigger delivery information to the network entity in a manner of further considering at least one of a roaming agreement or a local policy.

4. The method of claim 1, wherein if the serving node is not in a congestion status, the serving node transmits the trigger delivery information to the network entity.

5. The method of claim 1, wherein if it is expected that the serving node is not in a congestion status, the serving node transmits the trigger delivery information to the network entity.

6. The method of claim 1, wherein if a trigger request for a different user equipment which is attached to the serving node, uses the MTC-IWF and the serving node, the serving node transmits the trigger delivery information to the network entity.

7. The method of claim 1, wherein if the serving node does not support the trigger request via the MTC-IWF and the serving node for a prescribed time interval, the serving node does not transmit the trigger delivery information to the network entity.

8. The method of claim 1, wherein if the user equipment supports the trigger request via the MTC-IWF and the serving node, the serving node transmits the trigger delivery information to the network entity.

9. The method of claim 1, wherein the capability information is received together when the serving node receives an attach request from the user equipment.

10. A serving node device supporting a trigger request of an MTC-IWF (machine type communication-interworking function) in a wireless communication system, the serving node device comprising:
 a transceiver; and
 a processor configured to control the transceiver,
 wherein the processor is further configured to:
 receive capability information comprising trigger delivery information from a user equipment via a direct communication between the user equipment and the MTC-IWF, wherein the trigger delivery information indicates whether the user equipment supports the trigger request via the MTC-IWF and the serving node,
 determine whether to transmit the trigger delivery information to a network entity based on information on the user equipment including the capability information and information on the serving node, wherein the network entity is an HSS (home subscriber server) or an HLR (home location register), and,
 determine a trigger delivery mechanism among a plurality of trigger delivery mechanisms based on the capability information,
 wherein the capability information further comprises preference for each of the plurality of trigger delivery mechanisms based on a payment plan of the user equipment, and
 wherein the plurality of trigger delivery mechanisms consist of a T5a trigger mechanism using a reference point between the MTC-IWF and a SGSN (serving GPRS (general packet radio service) supporting node), a T5b trigger mechanism using a reference point between the MTC-IWF and a serving MME (mobility management entity), and a T5c trigger mechanism using a reference point between the MTC-IWF and a serving MSC (mobile switching center).

* * * * *